(12) United States Patent
Reyhanloo

(10) Patent No.: US 9,357,873 B2
(45) Date of Patent: Jun. 7, 2016

(54) COMBINATION UNIT COMPRISING A BEVERAGE PREPARATION MACHINE HAVING A MILK DISPENSING APPARATUS AND A MILK CHILLING DEVICE HAVING A MONITORING MEANS FOR THE FILLING LEVEL OF THE MILK IN THE MILK CONTAINER, AND METHOD FOR DISPENSING MILK AND/OR MILK FROTH BY MEANS OF A COMBINATION UNIT OF THIS KIND

(75) Inventor: Shahryar Reyhanloo, Immensee (CH)

(73) Assignee: JURA ELEKTROAPPARATE AG, Niederbuchsiten (CH)

( * ) Notice: Subject to any disclaimer, the term of this patent is extended or adjusted under 35 U.S.C. 154(b) by 102 days.

(21) Appl. No.: 13/696,957

(22) PCT Filed: May 10, 2011

(86) PCT No.: PCT/CH2011/000109
§ 371 (c)(1),
(2), (4) Date: Jan. 16, 2013

(87) PCT Pub. No.: WO2011/140667
PCT Pub. Date: Nov. 17, 2011

(65) Prior Publication Data
US 2013/0115343 A1    May 9, 2013

(30) Foreign Application Priority Data
May 10, 2010    (EP) .................................... 10405100

(51) Int. Cl.
*A47J 31/44*    (2006.01)
(52) U.S. Cl.
CPC .......... *A47J 31/4485* (2013.01); *A47J 2203/00* (2013.01)

(58) Field of Classification Search
USPC ......... 222/64–67, 129.1, 129.4, 146.6, 146.1, 222/145.1, 132, 51; 426/231; 99/279–281, 99/286, 291, 293, 294, 300, 302 R, 454
See application file for complete search history.

(56) References Cited

U.S. PATENT DOCUMENTS

| | | | | |
|---|---|---|---|---|
| 4,790,239 A | * | 12/1988 | Hewitt | ............................ 99/279 |
| 5,207,148 A | * | 5/1993 | Anderson et al. | ............... 99/281 |
| 5,498,757 A | * | 3/1996 | Johnson et al. | ............... 426/520 |
| 5,901,880 A | | 5/1999 | Clarke | |
| 6,006,654 A | * | 12/1999 | Pugh | ............................... 99/293 |
| 6,019,032 A | * | 2/2000 | Arksey | ............................ 99/452 |
| 6,650,962 B2 | * | 11/2003 | Sudolcan et al. | ............. 700/231 |
| 6,761,284 B2 | | 7/2004 | Knepler | ............................ 222/64 |
| 7,268,698 B2 | * | 9/2007 | Hart et al. | ................. 340/870.07 |
| 7,798,373 B1 | * | 9/2010 | Wroblewski et al. | ......... 222/209 |
| 2003/0070555 A1 | * | 4/2003 | Reyhanloo | ....................... 99/282 |
| 2010/0047406 A1 | * | 2/2010 | Reyhanloo | .................... 426/231 |
| 2010/0161140 A1 | * | 6/2010 | Doglioni Majer | ............ 700/283 |
| 2010/0187259 A1 | * | 7/2010 | Lussi | ........................ 222/129.4 |
| 2010/0212508 A1 | * | 8/2010 | Buttiker | ......................... 99/290 |

FOREIGN PATENT DOCUMENTS

| | | |
|---|---|---|
| DE | 20 2004 007987 U1 | 9/2005 |
| EP | 0 472 272 A2 | 2/1992 |
| EP | 2 020 198 A2 | 2/2009 |
| EP | 2 050 373 A1 | 4/2009 |
| WO | WO 2007/019993 A1 | 2/2007 |
| WO | WO 2008/077264 A1 | 7/2008 |
| WO | WO 2010/009975 | 1/2010 |

OTHER PUBLICATIONS

International Search Report from International Patent Application No. PCT/CH2011/000109, mailed Aug. 30, 2011.
Written Opinion from International Patent Application No. PCT/CH2011/000109, mailed Aug. 30, 2011.
Extended European Search Report from corresponding European Patent Application No. 10405100.8 dated Oct. 11, 2010.

\* cited by examiner

*Primary Examiner* — Paul R Durand
*Assistant Examiner* — Vishal Pancholi
(74) *Attorney, Agent, or Firm* — Alston & Bird LLP

(57) ABSTRACT

A combination unit comprising a beverage preparation machine (62) and a separate milk chilling device (10) for storing a volume (16) of milk in a chilled state. The beverage preparation machine (62) comprises a control electronics system (63) and a milk dispensing apparatus (64) for dispensing milk and/or milk froth. The milk chilling device (10) comprises a housing (11), a milk container (14), which is arranged in the housing (11), for accommodating the volume (16) of milk, a chilling unit (18) for chilling the volume (16) of milk, and a milk lance for removing milk from the milk container (14). A monitoring device for monitoring a filling state of the milk container (14) comprises a filling state sensor (34) for detecting a filling level of the milk in the milk container (14) and a filling state measurement electronics system (36), which is connected to the filling state sensor (34), for generating a filling state information signal, wherein dispensing of the milk and/or of the milk froth from the milk dispensing apparatus (64) can be controlled by means of the control electronics system (63) of the beverage preparation machine (62) depending on the filling state information signal which is generated by the filling state measurement electronics system (36). The filling state measurement electronics system (36) is arranged in or on the housing of the milk chilling device (10). The milk chilling device (10) comprises a transmitter (38) for transmitting the filling state information signal to the beverage preparation machine (62) by means of a radio signal, and the beverage preparation machine (62) comprises a transceiver (66) which receives the radio signal which is generated by the transmitter (38) of the milk chilling device (10) and provides the transmitted filling state information signal to the control electronics system (63) of the beverage preparation machine (62).

14 Claims, 9 Drawing Sheets

Figure 1A:
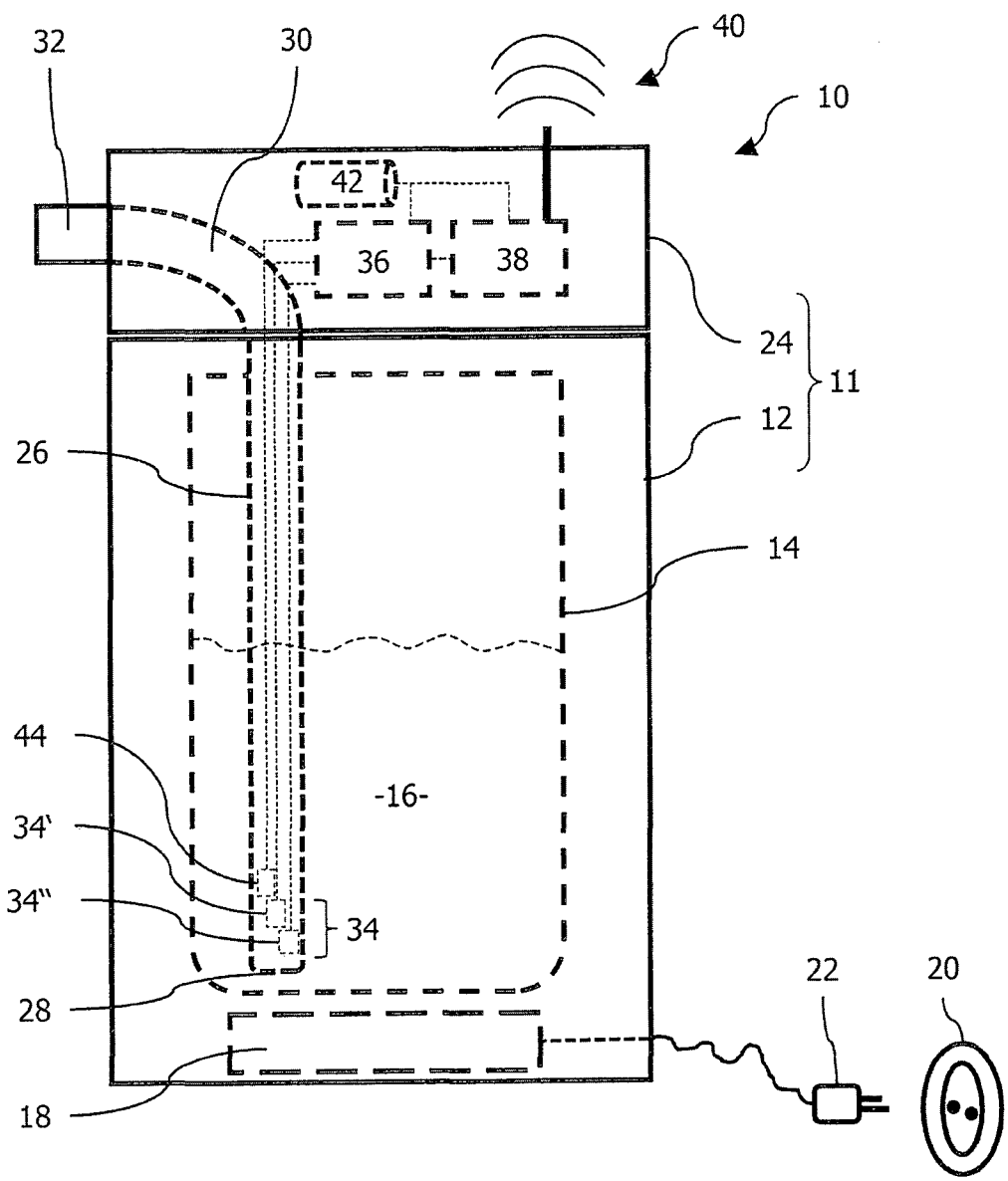

COMBINATION UNIT COMPRISING A BEVERAGE PREPARATION MACHINE HAVING A MILK DISPENSING APPARATUS AND A MILK CHILLING DEVICE HAVING A MONITORING MEANS FOR THE FILLING LEVEL OF THE MILK IN THE MILK CONTAINER, AND METHOD FOR DISPENSING MILK AND/OR MILK FROTH BY MEANS OF A COMBINATION UNIT OF THIS KIND

The invention relates to a combination unit comprising a beverage preparation machine equipped with a milk dispensing apparatus for dispensing milk and/or milk froth and a separate milk chilling device for storing a milk volume in a chilled state, and method for dispensing milk and/or milk froth by means of a combination unit of this kind.

Beverage preparation machines are known, in the case of which milk and/or milk froth are generated to prepare different coffee specialties, such as latte macchiato or cappuccino, for example, in a milk dispensing apparatus of the beverage preparation machine. For this purpose, a milk volume is sucked via a milk tube from a milk container, for example into a frothing device of the milk dispensing apparatus. The suction is realized with the help of the Venturi principle. When sucked into the frothing device, milk froth is then generated and/or the milk volume is simply heated.

In the event that too little or no milk at all is stored in the milk container, but the cycle for obtaining a milk volume is fixedly programmed in a control of the beverage preparation machine, insufficient coffee specialties are dispensed. In other words, the user obtains a commonly prepared coffee beverage without or with too little milk and/or milk froth. This is unsatisfactory for the user, because the entire process for preparing a desired coffee specialty must be repeated once again. He can then obtain the perfectly prepared coffee specialty only with a sufficiently filled milk container.

Oftentimes, the incomplete coffee specialty dispensed earlier is poured away. Resources, for example coffee beans, the (insufficient) milk volume, water and energy, are wasted. In addition, the user is expected to spend an unnecessary amount of time for the final preparation of the coffee specialty.

A particularly large disadvantage is that when the user has paid a fixed amount of money beforehand for obtaining the desired coffee specialty, he then still receives an insufficiently prepared coffee specialty. In particular in office buildings or in the food service industry, so-called coin coffee machines are set up, which dispense the coffee specialty only after payment of a specified amount of money. This payment can be realized by inserting coins into a coin slot of the machine or by debiting a specified amount of money from a virtual bank account, which is managed via a magnetic card system. An insufficiently dispensed coffee specialty, which, however, had been paid for sufficiently beforehand, leads to dissatisfaction of the users and to extensive and time-consuming complaints processes. These coin coffee machines are then possibly avoided. An insufficiently made coffee specialty thus also has negative financial impacts.

During the course of the preparation of the coffee specialty, an insufficiently filled milk container leads to an interruption of the milk supply. Through this, the obtaining of a homogenous milk outlet jet from a nozzle of the milk dispensing apparatus is interrupted. This interruption leads to an uncontrolled milk/steam dispensing from the nozzle, whereby milk, water and steam spray unpredictably in all directions. Through this, pieces of clothing of the user can be soiled. In addition, the user can come into direct contact with the hot milk/steam dispenser and can hereby contract burns or scalding. A further disadvantage is that the front side of the beverage preparation machine can be contaminated by milk, water and steam splatters.

To solve this problem, the user can control the filling level of the milk in the milk container prior to the preparation of his desired coffee specialty. However, the milk containers are typically not transparent, so that the user can only control the filling state of the milk in the milk container with a high effort. In the case of the coin coffee machines in office buildings or in the food service industry, precautions, which allow the user to control the filling state of the milk container prior to the preparation of his desired coffee specialty, are oftentimes not taken at all.

The provided milk should be stored in a chilled state, if possible. For this purpose, an insulated container, for example a double-walled structure comprising a vacuum space, or a refrigerator comprising a low capacity, which includes a peltier element, for example, is used in many cases. In the case of these milk containers, however, a control of the filling state is not possible at all, without having to open the milk container every time for this purpose. If at all possible, this is unpractical on the one hand and is additionally forgotten for the most part.

WO 2008/077264 A1 discloses a method for dispensing milk portions in drink preparation machines comprising a milk fill level monitoring unit for a milk container in an exemplary manner by means of a coffee machine provided to prepare cappuccino in combination with a milk container, which can be placed separately next to the respective coffee machine, as well as a milk fill level monitoring unit for the respective milk container. The milk fill level monitoring unit comprises a fill state sensor, which encompasses an electrically conductive measuring stick, which is fastened to a lid of the milk container. When the lid is attached to the milk container, the measuring stick projects into the milk container such that a lower end of the measuring stick encompasses a predetermined distance from the bottom of the milk container. The respective milk contained in the milk container can be sucked from the milk container via a suction tube, which encompasses a suction opening at its lower end, wherein the suction opening is arranged closer to the bottom of the milk container than the lower end of the measuring stick. The fill state sensor makes it possible to detect the fill level of the milk in the milk container by means of measuring the electrical conductivity between the measuring stick and a second electrically conductive body, which is still in contact with the milk in the milk container when the fill level of the milk should drop below the lower end of the measuring stick. In the instant case, the container, which accommodates the milk, or the suction tube can be provided as "second electrically conductive body", in the event that the container or the suction tube, respectively, are made of a corresponding material (for example a metal). In this case, the electrical conductivity between the measuring stick and the second electrically conductive body (container or suction tube, respectively), varies as a function of the fill level of the milk, wherein this conductivity drops abruptly when the fill level of the milk drops below the lower end of the measuring stick. To monitor the fill level, provision is made according to WO 2008/077264 A1 for two different alternatives.

In a first alternative, the measuring stick and the mentioned second electrically conductive body (container or suction tube, respectively), are electrically connected to the control electronics system of the coffee machine via a signal line, so that the control electronics system of the coffee machine can determine and evaluate the electrical conductivity between the measuring stick and the second electrically conductive body (container or suction tube). In this case, the control electronics system of the coffee machine thus has the function of a "fill state measuring electronics", which serves to generate a "fill state information signal", wherein the fill state information signal includes information relating to the fill level detected by the fill state sensor. This alternative has the advantage that the control electronics system of the coffee machine itself has the fill state information signal and can thus control a removal of milk from the milk container as a function of the fill level of the milk. Milk is thereby sucked from the milk container via a tube and is fed to a milk frother of the coffee machine, however advantageously only under the condition that the fill level is sufficient to be able to remove the quantity of milk, which is required for making a cappuccino, from the milk container. The disadvantage of this alternative, however, is that the fill state sensor or the measuring stick, respectively, and the second electrically conductive body (container or suction pipe, respectively), must be electrically connected to the control electronics system of the coffee machine via the signal line. This is uncomfortable for a user, in particular when cleaning the milk container, because there is a risk of damaging the signal line or of interrupting an electrical connection between the signal line and the coffee machine and/or the milk container (with the result that the control electronics system of the coffee machine could no longer detect the fill level of the milk). In addition, the freedom of positioning the milk container is additionally limited by the signal line, in particular because the milk container must mandatorily be connected to the coffee machine via a tube, so that a user must in each case pay attention to the arrangement of the tube and of the signal line.

In a second alternative of the milk level monitoring unit according to WO 2008/077264 A1, an external evaluation electronics system is arranged at the milk container itself, wherein fill state information is displayed on a display of the evaluation electronics system. The display only serves the purpose of informing a user about the fill level, so that a user can identify whether the milk container contains sufficient milk or whether the milk container must be filled. In this case, the fill state information is not used to control the coffee machine. This second alternative thus has the disadvantage that the control electronics system of the coffee machine cannot automatically prevent milk from being obtained from the milk container, when the fill level of the milk has dropped to the extent that the quantity of milk contained in the milk container is lower than that quantity of milk, which is required to prepare a certain beverage.

The instant invention is based on the object of avoiding the mentioned disadvantages and to provide for a beverage preparation machine in combination with a milk chilling device and a method for dispensing milk and/or milk froth by means of such a combination unit, so that a preparation of a coffee specialty with dispensing of milk, which is sufficient for this purpose, is possible, wherein a dispensing of milk and/or milk froth is to be capable of being controlled automatically as a function of the filling level of the milk in the milk container by means of a user-friendly monitoring means, which can be handled easily.

This object is solved by means of a combination unit of a beverage preparation machine to prepare a beverage and a separate milk chilling device for storing a milk volume in a chilled state comprising the features of patent claim 1. The object is furthermore solved by means of a method for dispensing milk and/or milk froth by means of a combination unit of a beverage preparation machine and a milk chilling device for storing a milk volume in a chilled state according to patent claim 13.

The beverage preparation machine thereby comprises a control electronics system and a milk dispensing apparatus encompassing a milk inlet for dispensing milk and/or milk froth. The milk chilling device comprises a housing, a milk container arranged in the housing for accommodating the milk volume, a chilling unit for chilling the milk volume, and a milk lance comprising an end, which projects into the milk container, and an end, which is fluidically connected to a milk outlet of the milk chilling device, for removing milk from the milk container, wherein the milk inlet of the milk dispensing apparatus is connected or can be connected to the milk outlet of the milk chilling device by means of a milk line.

A monitoring means for monitoring a filling state of the milk container is provided, which comprises a filling state sensor arranged in the milk container and/or in the housing of the milk chilling device, for detecting a filling level of the milk in the milk container and a filling state measurement electronics system, which is connected to the filling state sensor, for generating a filling state information signal, said filling state information signal includes information relating to the filling level detected by the filling state sensor, whereby a dispensing of the milk and/or of the milk froth from the milk dispensing apparatus can be controlled by means of the control electronics system of the beverage preparation machine as a function of the filling state information signal generated by the filling state measurement electronics system.

According to the invention, the filling state measurement electronics system is arranged in or on the housing of the milk chilling device. In addition, the milk chilling device comprises a transmitter for transmitting the filling state information signal generated by the filling state measurement electronics system to the beverage preparation machine via an air interface by means of a radio signal, which can be generated by the transmitter. Accordingly, the beverage preparation machine comprises a transmitter/receiver, which is designed to receive the radio signal generated by the transmitter of the milk chilling device and to provide the filling state information signal transmitted by means of the radio signal to the control electronics system of the beverage preparation machine.

Due to the fact that the filling state measurement electronics system is arranged in or on the housing of the milk chilling device, it is obtained that a filling level of the milk, which can be detected by means of the filling state sensor, can already be converted in the milk chilling device into a signal ("filling state information signal"), which contains information relating to the filling level and which can be processed with electronic means. In this case, a filling state information signal can accordingly be provided in the milk chilling device, without the filling state sensor having to be connected to the beverage preparation machine via a signal line. The condition for transmitting information relating to a filling level, which is detected by the filling state sensor, to the beverage preparation machine by means of a radio signal, is thus created. In addition, the control electronics system of the beverage preparation machine is not required to detect a filling state, which can be detected by the filling state sensor by means of a measurement technique and to convert it into a filling state information signal, which can be processed with electronic means.

Due to the fact that the milk chilling device comprises a transmitter for transmitting the filling state information signal generated by the filling state measurement electronics system by means of a radio signal, which can be generated by the transmitter, and the beverage preparation machine comprises a transmitter/receiver for receiving the radio signal generated by the transmitter of the milk chilling device, it is attained that information relating to the respective filling level of the milk in the milk chilling device can be provided to the control electronics system of the beverage preparation machine, without requiring a signal line between the milk chilling device and the beverage preparation machine.

Due to the fact that a dispensing of the milk and/or of the milk froth from the milk dispensing apparatus can be controlled by means of the control electronics system of the beverage preparation machine as a function of the filling state information signal, which is generated by the filling state measurement electronics system, it is attained that the filling state of the milk container of the milk chilling device is monitored automatically and that signals, which include information relating to the filling state, are transmitted to the transmitter/receiver of the beverage preparation machine by the transmitter of the milk chilling device. The filling state of the milk container is thus monitored continuously. In the event that the filling level of the milk volume in the milk container drops below a necessary milk volume, which is necessary to prepare a respective chosen coffee specialty, the milk product is not started. In the event that the signal changes while obtaining the milk ("too little milk"), the milk conveying can be stopped or interrupted immediately. In the alternative, a sufficiently dimensioned follow-up volume can be ensured, which is sufficient that the obtaining and thus the preparation of the coffee specialty can be finished reliably. After milk has been refilled, coffee specialties can then subsequently be obtained. In the case of an insufficient filling level of the milk volume in the milk chilling device, coffee products, to which milk does not need to be added, e.g. black coffee or espresso, can still be obtained.

Due to the radio transmission between a transmitter of the milk chilling device and the transmitter/receiver of the beverage preparation machine, a wired connection between the milk chilling device and the beverage preparation machine can be avoided. It is particularly advantageous that the use of a cable, which would interfere in response to a repeated opening and closing of the housing of the milk chilling device, can thus be avoided. The opening and closing of the housing is always necessary again for filling or refilling a milk volume into the milk container. A further advantage of the radio transmission is that the beverage preparation machine and the milk chilling device can be more flexibly positioned in relation to one another. In addition, further optional devices, which exchange data with the beverage preparation machine bidirectionally or which transmit data to the beverage preparation machine unidirectionally, can be included without any problems.

For example, the combination unit includes a milk tube, which is coupled between a milk outlet at the outside of the milk chilling device and a milk inlet at a milk dispensing apparatus of the beverage preparation machine. Through this, a milk volume, which is necessary to prepare a coffee specialty, is reliably sucked into the milk dispensing apparatus via the milk tube. The milk tube should be coupled to the milk inlet as well as to the milk outlet so as to be removable in a simple manner. Through this, the milk tube can be removed easily and can be subjected to a quick, yet thorough cleaning. A further advantage of the use of the milk tube is that it is particularly flexible, so that the beverage preparation machine and the milk chilling device can be positioned easily and flexibly in relation to one another.

In the case of an embodiment of the milk chilling device, the housing of the milk chilling device encompasses a milk container body, which comprises the milk container, and a lid for closing or covering the milk container. The lid can thereby be connected to one end of the milk lance such that the milk lance projects substantially completely into the milk container when the lid is arranged such that it covers or closes the milk container. The milk lance is thus removed easily from the milk volume, as soon as the lid is lifted off the milk container. One advantage of the milk lance, which is attached to the bottom side of the lid, is that it can be cleaned and rinsed quickly and easily, for example under running water. Any closing mechanism, such as a screw cap or a snap lock, for example, can be used to close and open the lid.

The milk outlet is attached to the outer surface of the lid. Through this, a fluid passage via the milk lance to the milk outlet is formed, starting at the milk container. The milk outlet can be coupled to one end of a milk tube, the wider end of which can be coupled to a milk dispensing apparatus of the beverage preparation machine. The position of the milk outlet at the outer surface of the lid should be well accessible for the user, so that the user can quickly and easily couple and uncouple the milk tube. For this purpose, the milk outlet can be attached to a peripheral area of the lid, for example.

For example, the filling state sensor can be attached to a peripheral area of the milk lance. It is made possible through this that the filling state sensor is in permanent contact with the milk volume and can thus reliably detect the filling state of the milk container when the lid is arranged such that it covers or closes the milk container. The milk lance as well as the filling state sensor can be cleaned in the course of the cleaning and rinsing.

For example, the entire fluid passage—starting from the suction of the milk to the outflow of the milk at the milk outlet—can be embodied as a unit, which can be separated from the lid body. This unit can be separated quickly and easily from the lid body and can be subjected to a separate, sufficient cleaning and rinsing. In particular the fluid passage, which is otherwise difficult to access, can thus be rinsed and cleaned in a highly reliable manner.

Preferably, the filling state measuring electronics systems and/or the transmitter are contained in the lid. Through this, the filling state sensor can be electrically connected in a permanently interruption-free manner to the filling state measuring electronics system, which is accommodated in the lid. The electrical connection (e.g. one or a plurality of lines), which is necessary for this, only has a slight length and runs substantially along the milk lance. This connection can be attached to a peripheral area of the milk lance. In the alternative, it can be embedded within a recess, which is introduced in longitudinal direction of the milk lance. In the alternative, it can be completely embedded in the material of the milk lance. In one case, in which the electrical connection is not embedded in the material of the milk lance, this electrical connection should be insulated, so as to avoid measuring value errors. The filling state measuring electronics system and/or the transmitter can be accommodated in a recess within the lid, which is freely accessible, for example being closed by means of a flap. In the alternative, the filling state measuring electronics system and/or the transmitter can be cast in the material of the lid. It is important in both examples that these electronic components are protected from moisture, for example from milk or water. Moisture can penetrate quickly, in particular in response to the cleaning of the lid under running water.

In the case of the afore-mentioned attachment of the milk lance to the unit, which can be separated from the lid body, however, an electrical interface between the separable unit and the main body of the lid must be provided, however, so as to be able to establish an electrical connection between the filling state sensor and the filling state measuring electronics system.

Preferably, the filling state sensor is attached to a sensor lance, which is fastened to the bottom side of the lid such that it projects substantially completely into the milk container when the lid is arranged such that it covers or closes the milk container. The filling state sensor can be attached to the distal end of the sensor lance and is permanently electrically connected to the filling state measuring electronics system contained in the lid. Through this, the attachment of the aforementioned electrical interface between the separable unit and the main body of the lid can be avoided. The particularly simple and direct electrical connection, which manages without an interface, is made possible by means of the particularly advantageous incorporation of the electronic components (filling state measuring electronics system and transmitter) in the lid and by the attachment of the filling state sensor to the sensor lance. Possible error sources, for example caused by a contamination of an interface by means of milk residues, etc., are made impossible through this.

Preferably, the filling state measuring electronics system and/or the transmitter can be supplied with electrical energy via at least one energy storage, in particular a battery or an accumulator. The energy storage can be arranged in or on the housing of the milk chilling device.

For example, the energy storage can be contained in the lid and can be electrically connected to the filling state measuring electronics system and/or the transmitter. These electronic components thus obtain their own low voltage power supply directly. One advantage of the arrangement of the electronic components together with their low voltage power supply in the lid of the milk chilling device is that no interfaces or connector elements, respectively, must be provided.

Preferably, the filling state measuring electronics system and/or the transmitter can be supplied with electrical energy via an external electrical energy source, which can be coupled to the milk container body. One advantage is hereby that the afore-mentioned energy storage, for example a battery or an accumulator in the lid can be saved, whereby the weight of the lid is reduced considerably. A high weight of the lid can be bothersome to the user in response to the filling or refilling of a milk volume. In addition, an exchange of used batteries or a recharging of the accumulator is avoided through this. As a whole, this example provides for a reduction of the weight of the lid as well as for a time and cost savings. In addition, the chilling unit comprised in the milk container body for chilling the milk volume is typically supplied anyways with electrical energy via an external electrical energy source. The external electrical energy source is embodied, for example, as a supply voltage, which is fed via an electrical outlet. This supply voltage (for example a 230 Volt/50 Hertz alternating current voltage) can be fed directly via a power cable, which can be coupled to the milk container body. This supply voltage can then be converted to a direct current low voltage supply, which is adapted to the electronic components, by means of a switch-mode power supply, which is also contained in the milk container body. In the alternative, the external electrical energy source can be embodied as a direct current low voltage supply, which has already been converted externally and which is provided by means of a wall wart.

Preferably, the external electrical energy source can be coupled electrically to the filling state measuring electronics system and/or the transmitter via an energy supply interface between the milk container body and the lid. These electronic components are thus also supplied with electrical energy even without an energy storage arranged in the lid, when the lid is arranged such that it covers or closes the milk container. The weight of the lid is reduced through this.

Preferably, the energy supply interface contains at least two interface elements, which are in each case oriented and arranged on the milk container body and on the lid such that they are electrically connected to one another when the lid is arranged such that it covers or closes the milk container. This particularly simple embodiment of the energy supply interface makes it possible to supply the electronic components, which are comprised in the lid, with electrical energy, which is fed from an external electrical energy source (for example the supply voltage from the electrical outlet), which can be coupled to the milk container body. The lid, however, can furthermore be removed from the milk container body or milk chilling device, respectively (for example for filling or refilling a milk volume or for cleaning and rinsing the lid). It goes without saying that, in this case, the electronic components comprised in the lid are electrically separated from the external electrical energy source. The electronic components are electrically connected in a reliable manner to the external electrical energy source only in the operating state (that is, when the lid is arranged such that it covers or closes the milk container).

Preferably, the filling state measuring electronics system and/or the transmitter are contained in the milk container body. In this alternative embodiment, the electronic components are not comprised in the lid. One advantage is that said lid can thus be designed independent on the specification of an accommodation of the electronic components (for example within a recess introduced therein, which is closed by means of a flap or by complete melting). In addition, the accommodation of the electronic components within the milk container body provides for a better access to the electronic components. A simple and quick maintenance is thus possible when an error occurs.

Preferably, the filling state measuring electronics system and/or the transmitter can be permanently supplied with electrical energy via an external electrical energy source, which can be coupled to the milk container body. These electronic components can thus be supplied with electrical energy without the energy supply interface described in the preceding embodiment.

For example, the filling state sensor can be coupled electrically to the filling state measuring electronics system via a sensor interface between the milk container body and the lid. The filling level sensor can thus be connected quickly and easily to the filling state measuring electronics system arranged in the milk container body, in that the lid is attached to the milk container body.

For example, the sensor interface includes at least two interface elements, which are in each case oriented and arranged on the milk container body and the lid such that they are electrically connected to one another when the lid is arranged such that it covers or closes the milk container. Contrary to the first embodiment, in the case of which the electronic components are comprised in the lid, the energy supply interface in the case of this second embodiment is exchanged with the sensor interface. However, this interface hereby does not transfer any electrical energy to the power supply of the electronic components. Instead, sensor signals comprising a low voltage amplitude are transferred here. A noise on the sensor signals of the filling state sensor, which is possibly introduced and superimposed via the interface, hereby has a lesser impact on the measuring result than a noise, which is possible superimposed on the energy supply.

For example, the filling state sensor is a passive measuring element for measuring an electrical resistance. The filling level of the milk volume in the milk container is thus detected by means of a technically reliable and proven measuring method. The filling level measuring electronics system hereby detects the measuring value of a resistance change and evaluates it. The filling level of the milk volume can thus be monitored constantly. A change of the detected electrical resistance can be detected by means of the filling state measuring electronics system as a drop of the milk volume within the milk container below a predetermined threshold value. In the alternative, the filling state sensor can be embodied as a capacitive filling level sensor. Further passive, active or optical sensor can be used as filling state sensors, which are suitable to detect a filling level of a fluid within a container. Sensor, which detect a drop of a filling level below a predetermined threshold value (for example a necessary milk dispensing) can furthermore be used as filling state sensor.

For example, the filling state sensor contains at least two electrically conductive sensor elements, which are electrically separated from one another and which are electrically connected separately to the filling state measuring electronics system. An exemplary filling state sensor for detecting the milk volume can contain two electrically conductive sensor elements, which are electrically connected to one another via the milk volume. The milk volume hereby serves as electrical conductor of a certain electrical resistivity or of a certain electrical conductance value, respectively. A drop of the milk volume below a certain threshold value (which is associated with a drop of the milk level) has the result that at least one of the conductive sensor elements does not have any contact to the milk volume. The electrical contact between the two sensor elements is thus also interrupted via the milk volume. In this case, the electrical resistivity between these two sensor elements increases to infinity. This rise of the electrical resistivity, in turn, is detected by means of the filling state measuring electronics system.

For example, the sensor elements are attached to surface areas of the milk lance or of the sensor lance. Through this, the sensor elements have a permanent and reliable surface contact with the milk volume in response to a sufficient filling of the milk container. The electrical resistance between these two sensor elements can thus be determined by means of the electrical conductivity of the milk, among others. The electrical conductivity is a measure for the resistance of a medium as compared to electrical current. It is reciprocal to the resistance (impedance) and is measured in Siemens (1 S=1 A/1 V). The specific conductivity of the milk (mS/cm) follows from the presence of electrolytes. The conductivity of the milk fluctuates as a function of the fat content of the milk and of the milk temperature, among others. The conductivity of the milk fluctuates approximately between 4.5 and 5.9 mS/cm in response to a temperature of 20° C.

For example, the sensor elements are in each case attached to the surface areas of the milk lance or of the sensor lance at such positions that—in the event that the lid is arranged such that it covers or closes the milk container—an electrical contact is established between at least two sensor elements via the milk volume filled in the milk container, when the milk volume contained in the milk container is larger than a necessary milk volume to prepare a desired coffee specialty, and the electrical contact is interrupted when the milk volume contained in the milk container is smaller than the necessary milk volume. In the case of an exemplary arrangement, more than two sensor elements can be arranged at the outer surface of the milk lance or sensor lance, which are oriented relative to one another in longitudinal direction of the respective lance. When the lid is arranged such that it covers or closes the milk container, these sensor elements are thus arranged on top of one another. In addition, these sensor elements can be connected to respective inlets of the filling state measuring electronics system via separate supply lines. The filling state measuring electronics system is hereby embodied such that it measures the electrical resistance between the lowermost sensor element (for example attached to the distal end of the milk lance or sensor lance) and the respective further sensor elements in each case.

In the case of a completely filled milk container, all of the sensor elements are thus in contact with the milk volume, so that an electrical resistance can be measured between the lowermost sensor element and the respective further sensor elements. A decreasing milk volume and an associated drop of the milk level have the result that the milk level drops below the uppermost sensor element, for example. The electrical resistance between the lowermost sensor element and this uppermost sensor element thus rises to virtually infinity ($R \rightarrow \infty$). This change in the electrical resistance is detected by means of the filling state measuring electronics system and is evaluated and output as changed filling state information. A further decreasing milk volume and an associated drop of the milk level below the second-highest sensor element are also detected by means of the filling state measuring electronics system and are evaluated and output as changed filling state information. This process continues in discrete steps. The filling level of the milk volume in the milk container can be detected and output reliably through this. The accuracy of the statement relating to the filling state of the milk level in the milk container also increases with the increasing number of the sensor elements, which are arranged on top of one another.

For example, the milk chilling device contains a display element, which is attached to an outer surface of the milk chilling device, and which is electrically connected to the filling state measuring electronics system, for optically displaying information relating to the filling state of the milk container. The filling level of the milk volume can be displayed through this with the help of the display element (which is attached to the upper side of the lid, for example). The display element can be a luminous pictogram or an LED. The optical display can be information, which provides an indication relating to the contained milk volume (for example 1000 milliliter, 500 milliliter, 250 milliliter, etc.). In a simple embodiment, the optical display can only provide an indication that the contained milk volume has dropped below a predetermined threshold value volume (necessary milk volume). In this case, a single LED can light up, for example.

For example, the milk chilling device further contains a temperature sensor, which is designed to generate a temperature signal in response to a detected temperature of the milk volume in the milk container. In addition, the milk temperature can be monitored through this. In the event that the milk temperature has permanently exceeded a predetermined temperature threshold value for longer than a predetermined period of time, this information can be provided to the user. The obtaining of possibly spoiled milk can be prevented through this.

For example, the temperature sensor is electrically connected to the transmitter, which is further designed to transfer the temperature signal via the air interface to the beverage preparation machine. The information relating to the milk temperature can hereby be provided to the user by means of a display at the beverage preparation machine. In the alternative or additionally, this information can be displayed at a display, which is attached to an outer surface of the milk chilling device, for example on the upper side of the lid. For example, apparatuses, which prevent a milk volume from being obtained, when information is present that the milk volume was subjected to a temperature above a predetermined maximum temperature for more than a predetermined maximum period of time, can be provided at the beverage preparation machine. The obtaining of a beverage of spoiled milk, which does not have a hygienically satisfactory condition, can thus be avoided ahead of time.

For example, the temperature sensor is attached to a peripheral area of the milk lance or sensor lance. The temperature sensor can thus also reliably detect quick and/or high temperature fluctuations of the milk volume.

One embodiment of the beverage preparation machine comprises: a user interface, via which different coffee specialties can be chosen manually; a database, which stores information relating to a necessary milk volume to prepare a coffee specialty, which can in each case be selected at the user interface; a decision logic comprising inputs, which are in each case connected to the transmitter/receiver, the user interface and the database, wherein the decision logic is designed to read out information relating to a milk volume, which is necessary for this, from the database in response to an input at the user interface, to compare this information with the received information relating to the filling state of the milk container, and to only dispense milk from the milk dispensing apparatus under the condition that the milk volume contained in the milk container is not smaller than the milk volume, which is necessary to prepare the respective selected coffee specialty.

A significant advantage of this beverage preparation machine is that the decision logic decides whether the milk volume contained in the milk container is sufficient to prepare the selected coffee specialty on the basis of inputs from the transmitter/receiver (information relating to the filling level of the milk volume in the milk container), the user interface (information relating to the respective manually selected coffee specialty) and the database (information relating to a necessary milk volume to prepare the respective selected coffee specialty). In the event that the milk volume is sufficient, this coffee specialty is prepared. In the event that the milk volume is not sufficient, the coffee specialty is not prepared. In this case, only black coffee or espresso can be dispensed. Perfect coffee specialties with sufficient milk are thus always prepared.

For example, the beverage preparation machine contains an electrically controllable fluid valve, which is electrically connected to the outlet of the decision logic, wherein the fluid valve is designed to open a fluid passage for conveying steam through the milk dispensing apparatus when outputting the release signal to release the dispensing of milk. Through this, the dispensing of milk is made possible on the basis of a decision made by the decision logic with a particularly simple and cost-efficient design. A fluid valve for opening or closing a line for conveying a steam through the milk dispensing apparatus is already contained in many beverage preparation machines. Commonly, this fluid valve is turned on or off electrically by manually operating a button or a switch. Fluid valves, which can be operated in a purely mechanical manner, are also known.

For example, the milk dispensing apparatus contains a chamber for generating an underpressure, in which an underpressure can be generated when conveying the steam, wherein the chamber is fluidically connected to the milk inlet. This arrangement provides for a certain quantity of milk to be sucked from the milk container into the chamber via the milk tube. This sucking takes place on the basis of the Venturi principle in the chamber (underpressure chamber), in which an underpressure can be generated when conveying the steam.

For example, the transmitter/receiver is further designed to receive a temperature signal, which contains information relating to a temperature of the milk volume in the milk container of the milk chilling device. The radio signal transmitted between the transmitter of the milk chilling device and the transmitter/receiver of the beverage preparation machine via the air interface can be transmitted on an ISM band (Industrial, Scientific and Medical Band) carrier frequency of 2.4 GHz or another carrier high-frequency. A transmission can be carried out worldwide on the ISM band carrier frequency without registration and license. The transmitter/receiver can be integrated into a control of the beverage preparation machine. In a particularly advantageous manner, the transmitter/receiver can be inserted at a suitable interface of the beverage preparation machine, so as to be capable of being removed. The communication between the transmitter/receiver and the control is thereby carried out in a wired manner. For example, the above-described decision logic can be contained in the control. Prior to obtaining milk, the control can query the respective filling level of the milk volume via the radio path between the transmitter and the transmitter/receiver. When the milk volume stored in the milk container is smaller than a predetermined minimum milk volume, the preparation of the coffee specialty is not started. The transmitter/receiver is designed to transmit and/or receive an information signal. The transmitter/receiver can thus only contain one receiving unit.

For example, the beverage preparation machine furthermore contains a display device, which is attached to an outer surface thereof and which is electrically connected to the transmitter/receiver, for optically displaying information relating to the filling state of the milk container and/or relating to the temperature of the milk volume in the milk container. Information relating to the filling state of the milk container and possibly additionally relating to the temperature of the milk volume can thus be displayed or reported, respectively, to the user in an advantageous manner directly at the beverage preparation machine.

Preferably, the combination unit further contains at least one auxiliary unit comprising a radio device for transmitting an auxiliary unit information signal to the beverage preparation machine and/or for receiving a beverage preparation machine information signal from the beverage preparation machine via one air interface, in each case. The radio device can be designed as a transmission/receiving device, for example, and can in each case be used in further auxiliary units in cooperation with the beverage preparation machine. The control of the beverage preparation machine can thus be informed in a wireless manner about the state of these auxiliary units. For example, a billing system can be implemented (coin or chip counter, key U-key, cards with a virtual balance, credit cards), in that the paid amount is reported to the beverage preparation machine and the latter then releases or blocks the obtaining of a coffee specialty. The radio device can furthermore be used in the case of service or in the case of the unit production, so as to import or read out an electronic memory of the beverage preparation machine.

The method according to the invention for dispensing milk and/or milk froth by means of a combination unit of a beverage preparation machine to prepare a beverage and a milk chilling device for the chilled storing of a milk volume comprising the steps:

detecting a filling state of a milk container of the milk chilling device, transmitting information relating to the filling state of the milk container to the beverage preparation machine by means of a radio signal via an air interface, applying this information to a decision logic of the beverage preparation machine, selecting a coffee specialty via a user interface of the beverage preparation machine and transferring information relating to the selected coffee specialty to the decision logic, reading out information relating to a respective necessary milk volume to prepare a respective chosen coffee specialty from a database, comparing the information relating to the necessary milk volume to the information relating to the filling state of the milk container, wherein the decision logic generates a release signal for releasing a dispensing of a portion of milk and/or milk froth, when the filling level of the milk in the milk container is not less than the necessary milk volume, and/or wherein the decision logic generates a non-release signal for the non-release of the dispensing of a portion of milk and/or milk froth, when the filling level of the milk in the milk container is less than the necessary milk volume, and applying the release-signal or the non-release signal to an electrical fluid valve of a milk dispensing apparatus of the beverage preparation machine.

It is ensured through this that coffee specialties with the respective milk volume, which is necessary for this, are prepared and dispensed at the beverage preparation machine. In the event that it is detected that the filling state of the milk container in the milk chilling device is too low to be able to prepare a respective desired coffee specialty from this, the obtaining of a portion of milk from the milk container is not even started. In this case, a coffee product, for example, can still be obtained—but prepared without milk.

Preferably, the method further contains the step: transmitting information relating to the temperature of the milk volume in the milk container to the beverage preparation machine via the air interface. A radio device, which comprises at least one transmitter and/or receiver, can also be used in further auxiliary units, for example, in cooperation with the beverage preparation machine. The control of the beverage preparation machine can thus be informed of the state of these auxiliary units in a wireless manner. Preferably, the method further contains the step: displaying information relating to the filling state of the milk container and/or relating to the temperature of the milk volume in the milk container at the milk chilling device and/or at the beverage preparation machine. The user can thus be informed quickly and easily about the filling level and/or the temperature of the milk volume.

Figure 1B:
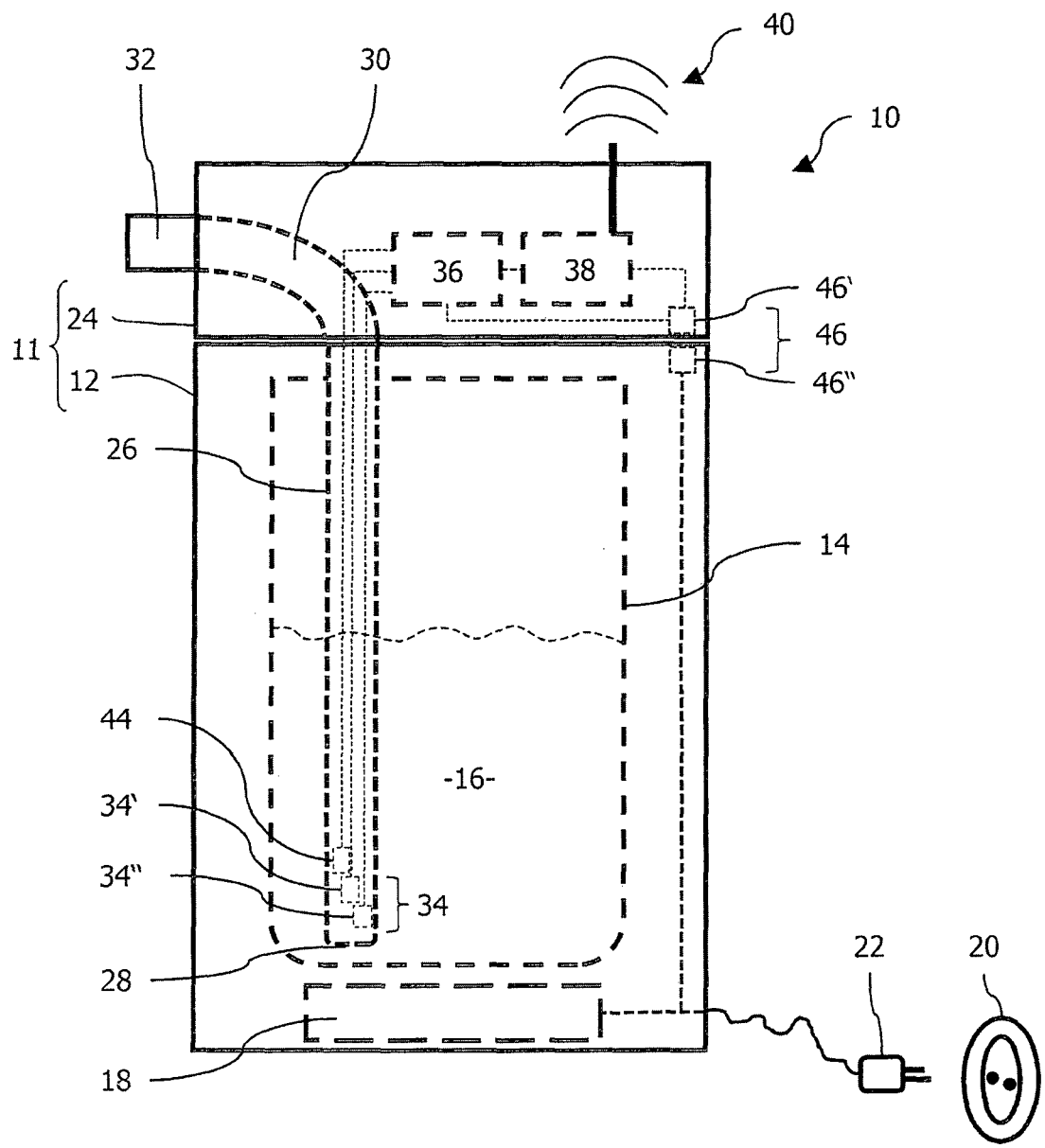
Figure 1C:
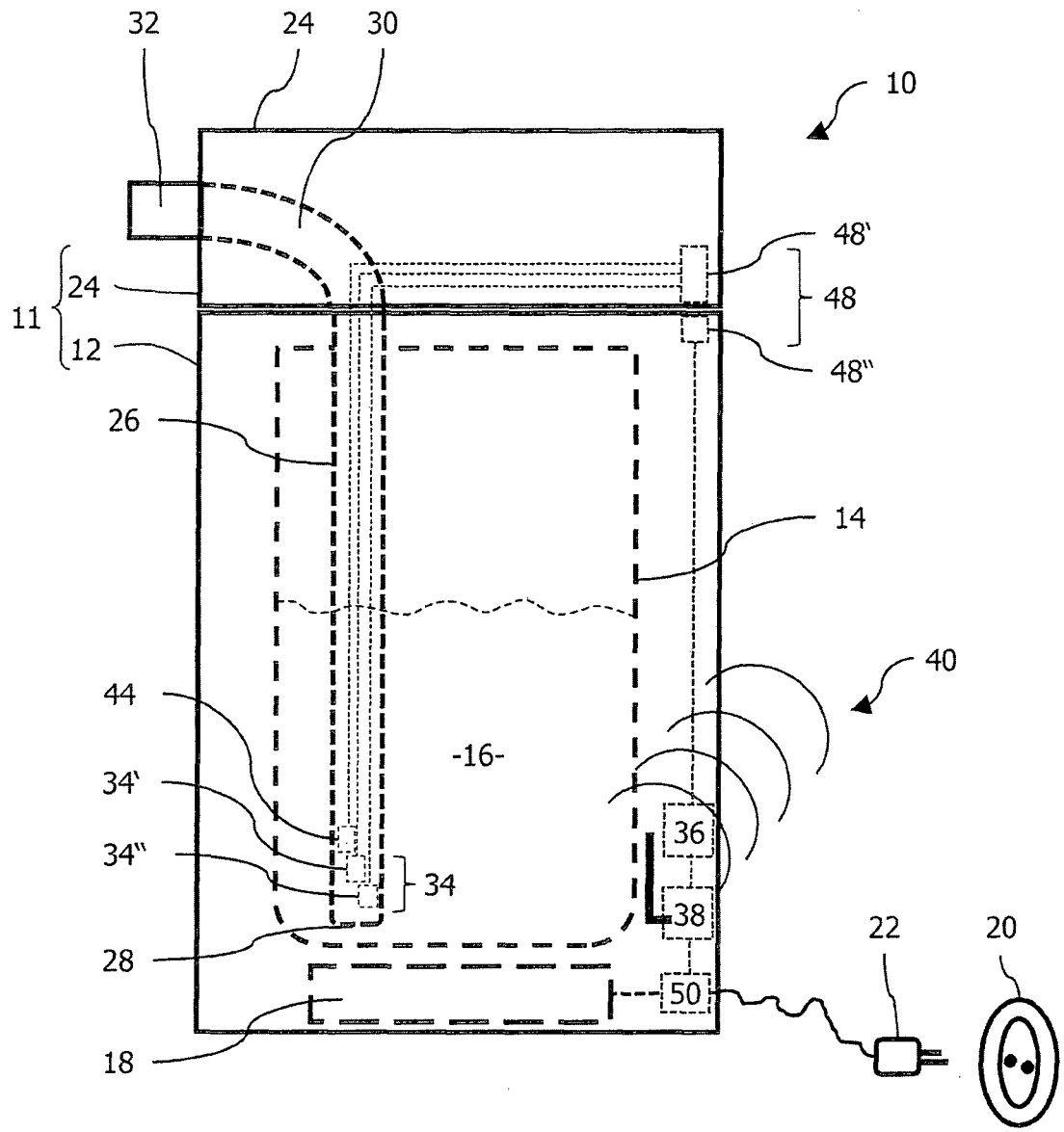
Figure 2A:
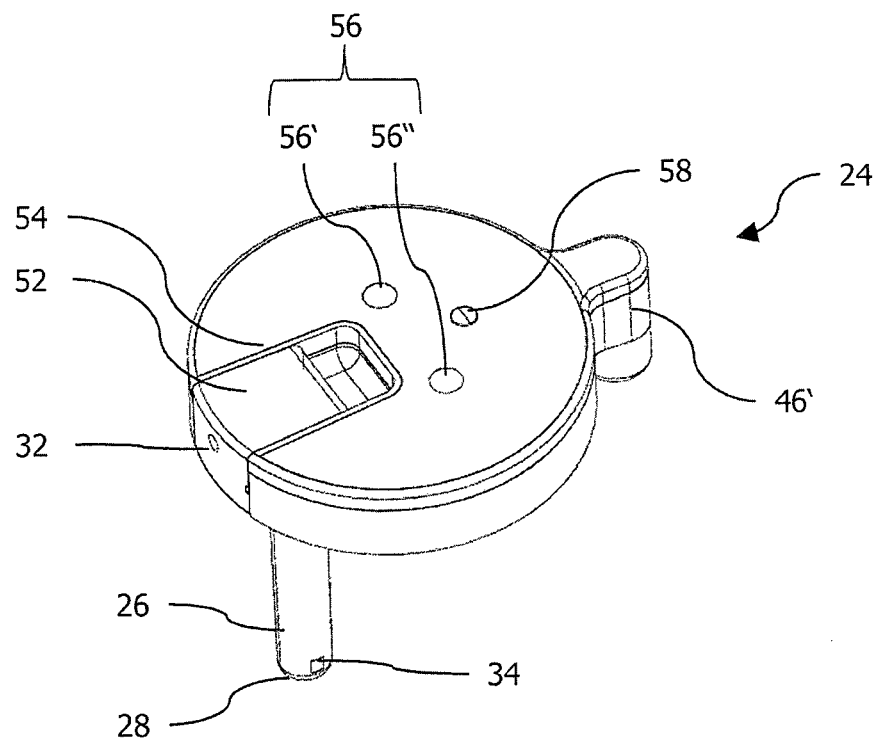
Figure 3A:
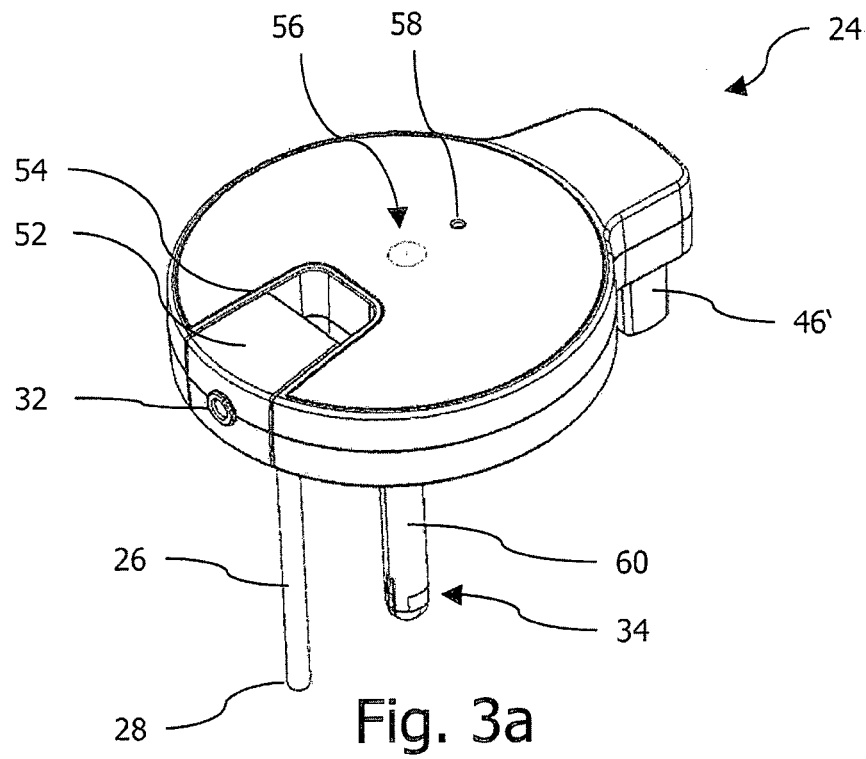
Figure 4:
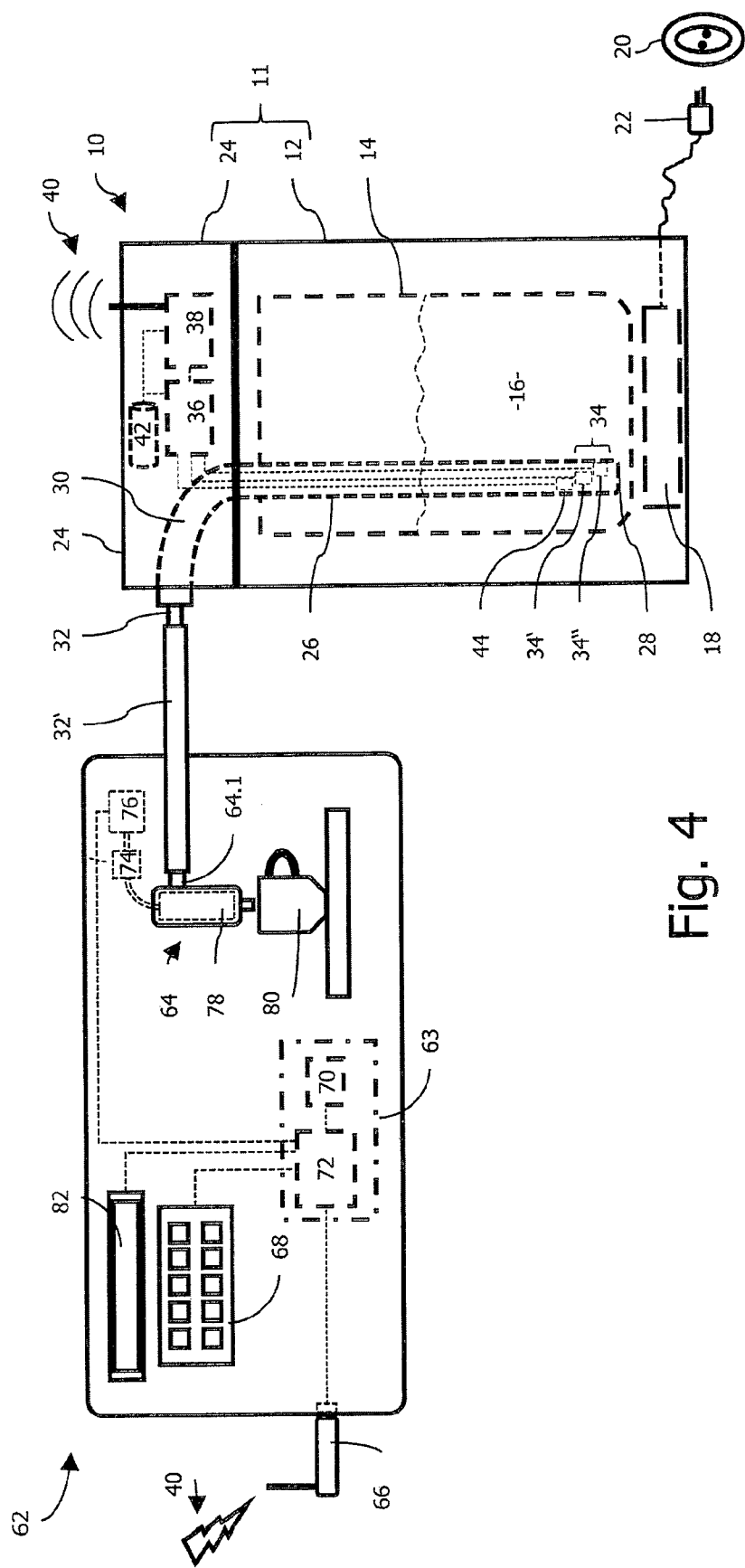
Figure 5A:
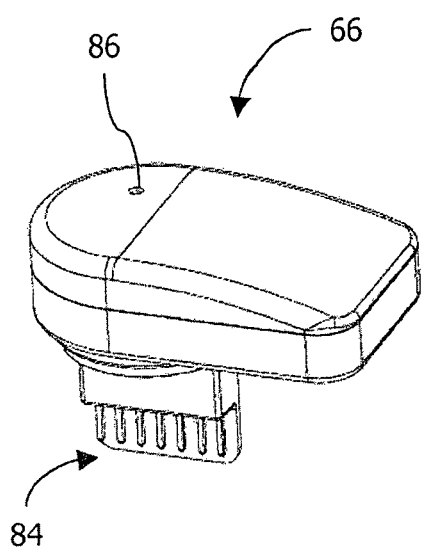
Figure 5B:
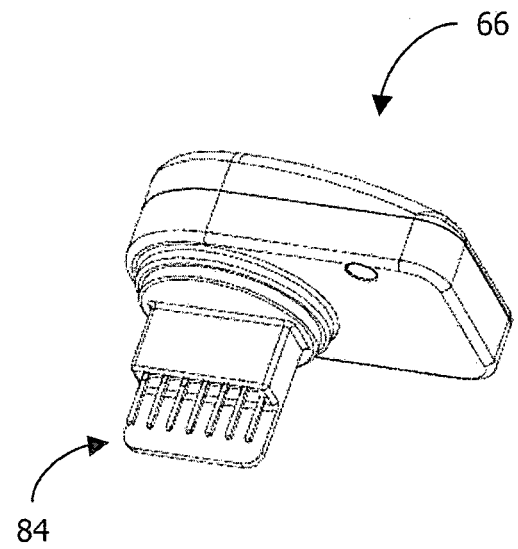
Figure 5C:
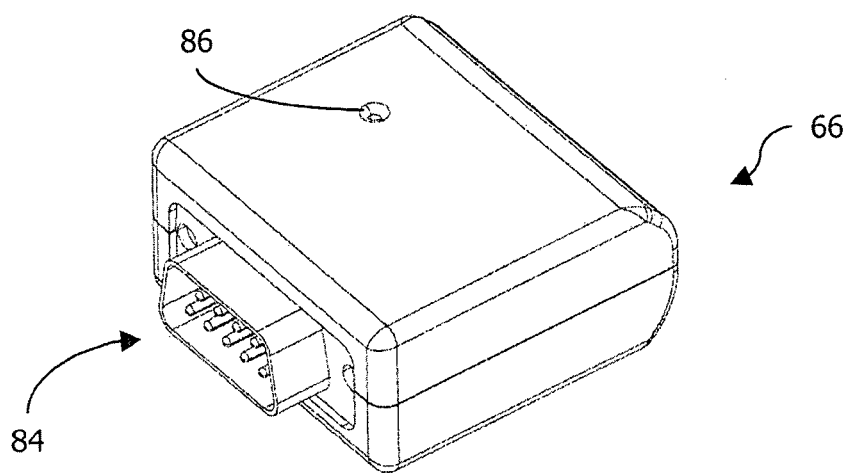
Figure 6:
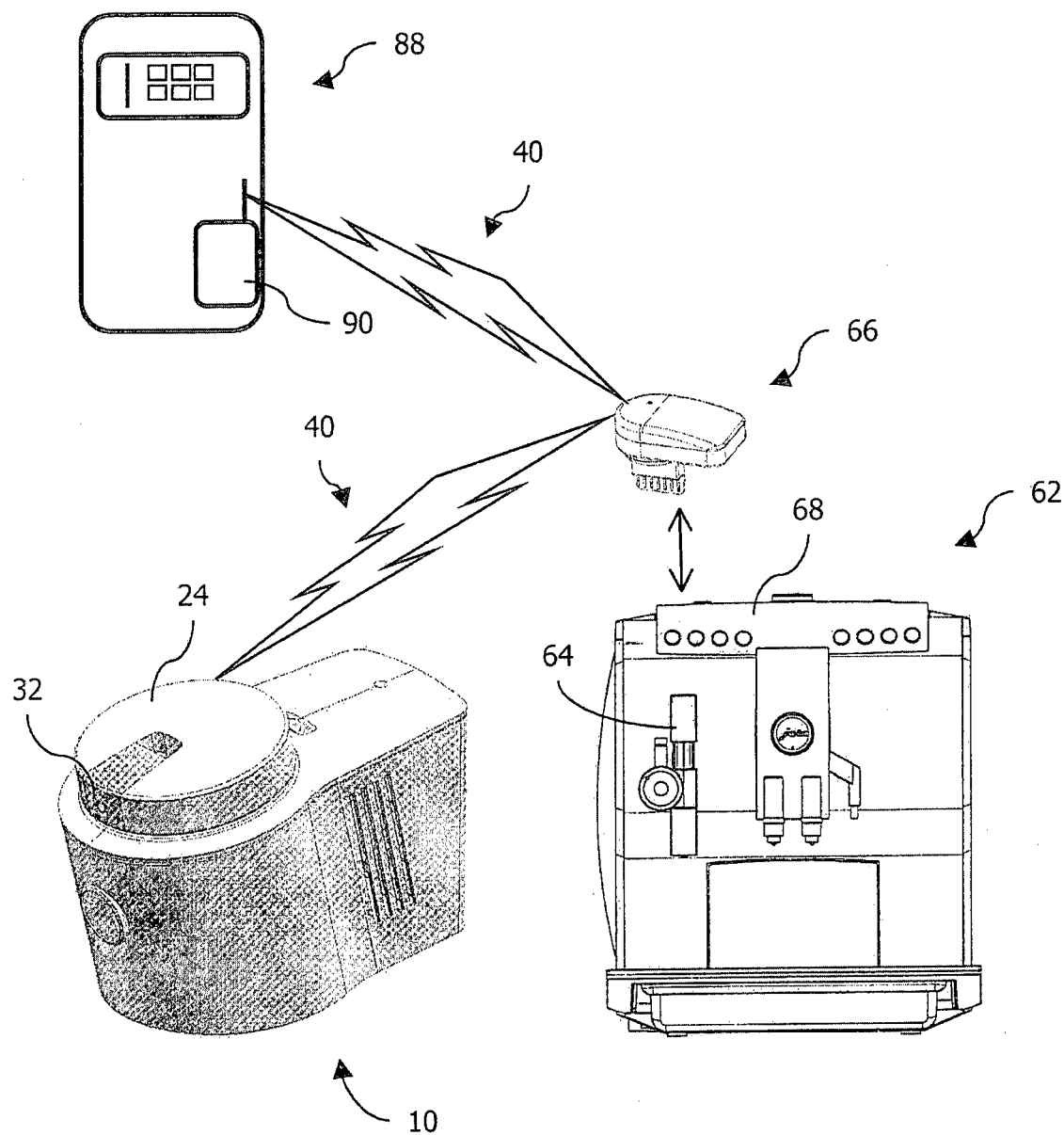
Figure 7:
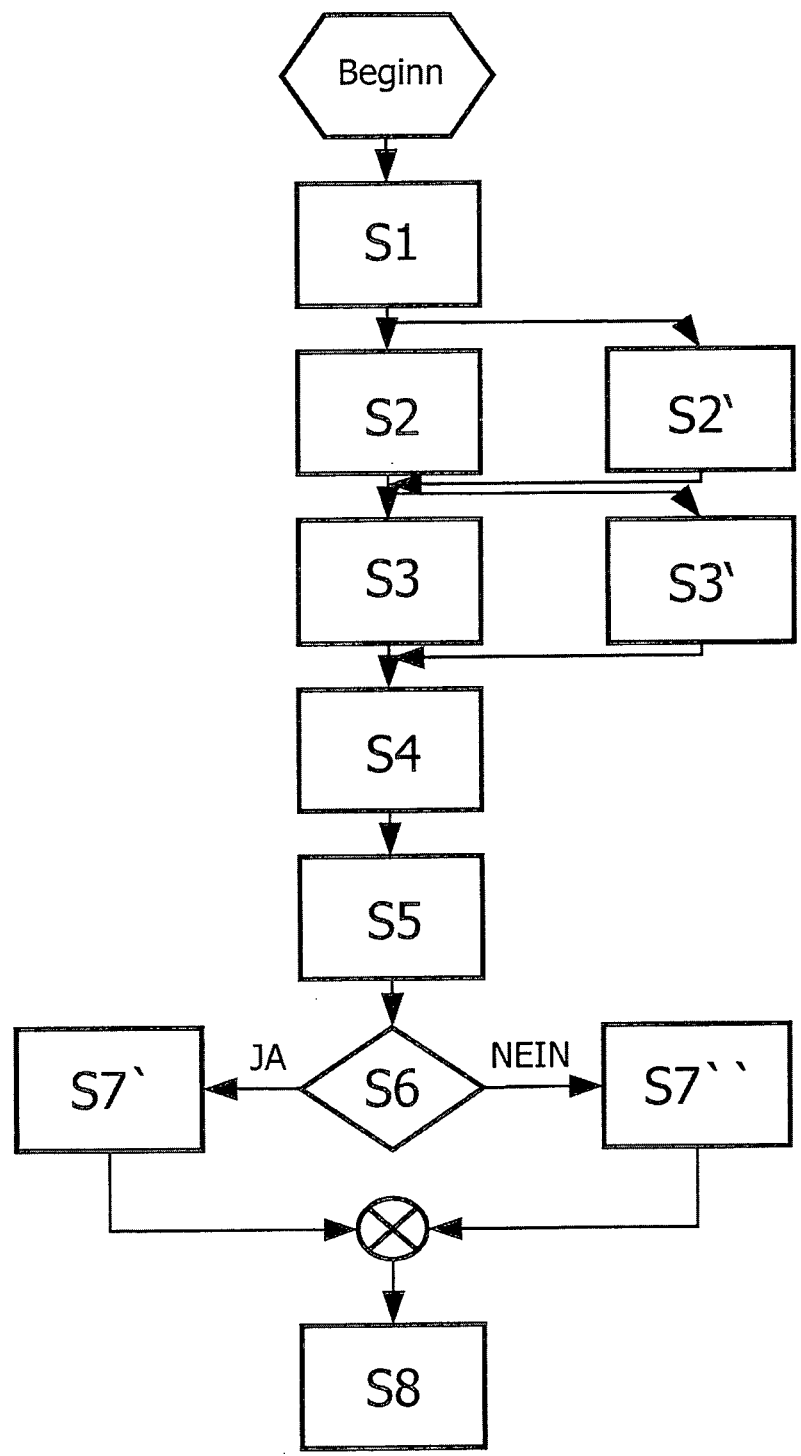

Further details of the invention will be explained below by means of the enclosed drawings:

FIGS. 1a-c in each case show a schematic sectional view of a milk chilling device in three different embodiments;

FIGS. 2a, b in each case show a view onto the upper side and bottom side of a lid of the milk chilling device according to a first example;

FIGS. 3a, b in each case show a view onto the upper side and bottom side of a lid of the milk chilling device according to a second example;

FIG. 4 shows a schematic sectional view of a combination unit of a beverage preparation machine comprising a milk chilling device according to FIG. 1a;

FIGS. 5a-c show different examples of a transmitter/receiver, which can be plugged into the beverage preparation machine;

FIG. 6 shows a schematic illustration of a combination unit of the milk chilling device and the beverage preparation machine; and FIG. 7 shows a flow chart for a method according to an embodiment of the instant invention.

FIGS. 1a to c in each case show a schematic sectional view of a milk chilling device in three different embodiments.

FIG. 1a hereby shows a sectional view of a milk chilling device 10 according to the invention in a first embodiment. The milk chilling device 10 is suitable for storing milk in a chilled state and can be connected to a beverage preparation machine (not illustrated) via a milk tube (not illustrated). The beverage preparation machine can thus suck chilled milk out of the milk chilling device 10, if needed. The milk chilling device 10 is defined to the outside by means of a housing 11. One component of the housing 11 is a milk container body 12, among others, which comprises a milk container 14 for accommodating a milk volume 16. The milk container 14 can be removably inserted into the milk container body 12. In the alternative, the milk container 14 and the milk container body 12 can be embodied in one piece. The milk chilling device 10 furthermore contains a chilling unit 18 for chilling the milk volume 16. The chilling unit 18 can contain a Peltier element, for example. The chilling unit 18 is supplied with electrical energy via an external electrical energy source 20 (for example an electrical outlet with a 230 V/50 Hz supply voltage). This supply voltage is converted via a wall wart 22 to a direct current low voltage (e.g. 12 V or 24 V), which is applied to the chilling unit 18. Even though it is not illustrated in the Figure, the 230 V/50 Hz supply voltage of the external electrical energy source 20 can be fed directly to a switch-mode power supply (not illustrated), which is contained in the milk container body 12. This switch-mode power supply converts the supply voltage into the direct current low voltage for operating the chilling unit 18.

The housing 11 of the milk chilling device 10 furthermore contains a lid 24 for closing the milk container 14. The lid 24 can furthermore close the milk container body 12. The closing mechanism for closing the milk container 14 or the milk container body 12, respectively, can be a screw cap, a snap lock or any further closure for tightly closing and opening the lid 24 with the milk container 14. A milk lance 26, which extends from the bottom side of the closed lid 24 essentially vertically downwards into the milk volume 16, is arranged on the bottom side of the lid 24. The milk lance 26 is thereby arranged and embodied such that it extends substantially completely within the space of the milk container 14, when the lid 24 is arranged such that it covers or closes the milk container 14 or the milk container body 12, respectively. Under these circumstances, the distal end of the milk lance 26 is only slightly spaced apart from the bottom of the milk container 14. This distance can be from 1 to 5 mm, for example. Virtually the entire content of the milk container 14 can thus be emptied. A milk lance opening 28, which leads into a duct (not illustrated), which runs in the interior along the milk lance 26, is arranged at this distal end of the milk lance 26. This duct is connected to a conveying line 30 in the interior of the lid 24, which leads into a milk outlet 32 at the outside of the lid 24. The milk lance opening 28 and the milk outlet 32 are thus fluidically connected.

The milk lance 26 further comprises a filling state sensor 34, which is attached to a peripheral area of the milk lance 26. This filling state sensor 34 can generate a sensor signal in response to a filling state of the milk container 14. The filling state sensor 34 can be a passive measuring element for measuring an electrical resistance. It can hereby contain at least two electrically conductive sensor elements 34', 34", which are attached to surface areas of the milk lance 26 so as to be electrically separated from one another and which are in each case separately connected to an electrical line. The filling state sensor 34 is connected to a filling state measuring electronics system 36 arranged in the lid 24, which is designed to generate a filling state information signal from the sensor signal of the filling state sensor 34, which contains information relating to the filling state of the milk container 14. This filling state measuring electronics system 36 is electrically connected to a transmitter 38, which can transmit this filling state information signal to a beverage preparation machine via an air interface 40 by means of a radio signal.

The filling state sensor 34 and the filling state measuring electronics system 36 are components of a monitoring means for monitoring a filling state of the milk container 14 or for monitoring a filling level of the milk in the milk container 14, respectively.

In this described example of the first embodiment, the filling state measuring electronics system 36 as well as the transmitter 38 are thus contained in the lid 24. These electronic components are supplied with electrical energy by means of an energy storage 42. This energy storage 42 can contain one or a plurality of batteries or one or a plurality of rechargeable accumulators. This energy storage 42 is removably accommodated within the lid 24 in a closable recess, which can be accessed from outside, and is electrically connected to the filling state measuring electronics system 36 as well as to the transmitter 38. An advantage of this arrangement is that the milk chilling device 10 can manage without any interfaces, because all of the electronic components (filling state measuring electronics system 36 and transmitter 38), including their energy supply (energy storage 42), are accommodated in the lid 24.

The milk chilling device 10 furthermore contains a temperature sensor 44, which is also attached to a peripheral area of the milk lance 26. Through this, the temperature sensor 44 (in the closed state of the lid 24 on the milk container 14) is in direct contact with the milk volume 16 and can thus also reliably detect rapid temperature fluctuations of the milk volume 16. The temperature sensor 44 generates a temperature signal in response to the detected temperature of the milk volume 16. The temperature sensor 44 is electrically connected to the filling state measuring electronics system 36 and/or the transmitter 38. The transmitter 38 transmits the temperature signal to the beverage preparation machine via the air interface 40. The temperature of the milk volume 16 can thus be displayed at a display device for the beverage preparation machine, for example. In the alternative or additionally, the temperature of the milk volume 16 can be displayed directly on the milk chilling device 10 on a display device.

FIG. 1b shows an example of the milk chilling device 10 in a second embodiment. The filling state measuring electronics system 36 and the transmitter 38 are hereby supplied with electrical energy via the external electrical energy source 20, which is coupled to the milk container body 12. The electrical connection for this is established via a energy supply interface 46 between the milk container body 12 and the lid 24. This energy supply interface 46 contains two interface elements 46', 46", for example, each of which are oriented and arranged on the milk container body 12 and the lid 24 such that they are electrically connected to one another when the lid 24 is arranged such that it covers or closes the milk container 14 or the milk container body 12, respectively. The lid 24 can thus furthermore be removed from the milk container 14 without any problems, so as to fill up milk or so as to clean the lid 24 and/or the milk container 14. In this example, the filling state sensor 34 remains permanently electrically connected to the filling state measuring electronics system 36.

An advantage of this arrangement is that an energy storage (see FIG. 1a) is now no longer necessary. The weight of the lid 24 is reduced through this. In addition, batteries must no longer be replaced or accumulators must no longer be recharged. Due to the fact that the external electrical energy source 20 is coupled to the milk container body 12 in any event, so as to supply the chilling unit 18 with electrical energy, for example, additional efforts must also not be made.

FIG. 1c shows an example of the milk chilling device 10 in a third embodiment. The filling state measuring electronics system 36 and transmitter 38 are hereby accommodated directly in the milk container body 12. The supply of these electronic components with electrical energy hereby takes place analogous to the example from the second embodiment, that is, via the external electrical energy source 20, which is coupled to the milk container body 12. The difference hereby is that the energy supply interface between the milk container body 12 and the lid 24, which is mentioned in the example from the second embodiment, is not necessary anymore. A sensor interface 48 between the milk container body 12 and the lid 24, via which the filling state sensor 34 can be electrically coupled to the filling state measuring electronics system 36, is necessary for this purpose. This sensor interface 48 contains two interface elements 48', 48", each of which are oriented and arranged on the milk container body 12 and on the lid 24 such that, in the closed state of the lid 24, they are electrically connected to one another on the milk container body 12. The electronic components can be supplied with electrical energy via an energy supply distributor block 50.

A further advantage of the third embodiment as compared to the first and the second embodiment is that the electronic components can be arranged and electronically connected much easier within the milk container body 12 than in the lid 24. Precautions must now also not be made anymore on the lid 24, for sealing electronic components against the ingress of moisture (for example water in response to cleaning or spilled milk). The lid 24 can thus be designed much more simply, more compact and can be produced at a lower cost.

The design of the sensor 34 is identical in the case of all of the examples according to the first to third embodiment. The afore-mentioned sensor elements 34', 34" of the filling state sensor 34 are in each case attached to surface areas of the milk lance 26 at such positions that they are in contact with (are immersed in) the milk volume 16, as long as the stored milk volume 16 is larger than a necessary milk volume to prepare a desired coffee specialty. In the event that the milk volume 16 stored in the milk container 14 is lower than the necessary milk volume to prepare the desired coffee specialty, at least one of the sensor elements 34', 34" is no longer in contact with the milk volume 16. The electrical contact between the sensor elements 34', 34" is also interrupted through this.

It goes without saying that more than two sensor elements can also be arranged in longitudinal direction of the milk lance 26, so that discrete filling level heights can be detected. An exceeding/falling below of a respective filling level height, for example, can thus be detected to prepare a latte macchiato, cappuccino, coffee with milk or of a further coffee specialty. The respective preparation is not started when a respective filling level height is fallen below. It is thus avoided that a coffee specialty, which is prepared with an insufficient quantity of milk, is obtained.

Even though the filling state sensor 34 or the sensor elements 34', 34", respectively, are illustrated in FIGS. 1a to c so as to be attached to the milk lance 26, they can also be attached to a separate lance.

Figure 2B:
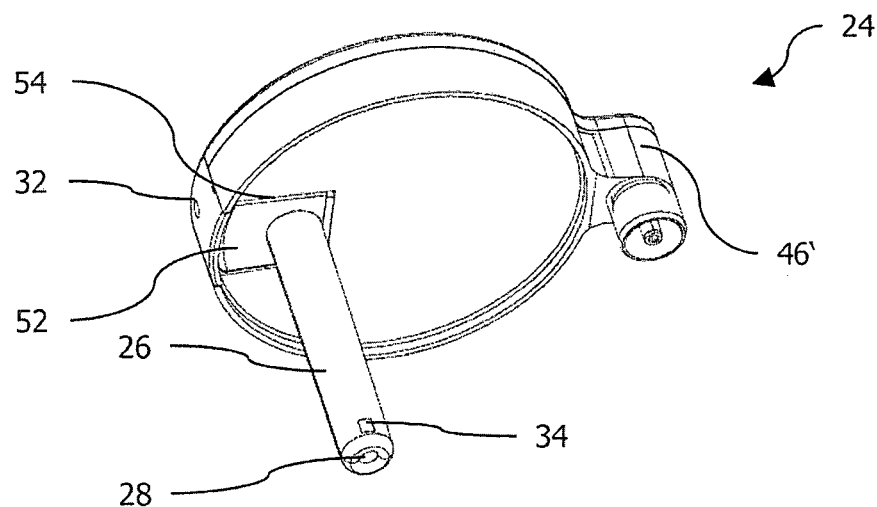

FIGS. 2a and b in each case show a first example of the lid 24 in a top view (FIG. 2a) and in a bottom view (FIG. 2b) in perspective illustration. The design of the lid 24 is based on the lid of the milk chilling device 10 illustrated in FIG. 1b in the second embodiment. The lid 24 contains the milk lance 26, which is attached to a coupling piece 52, which can be removably inserted into a recess 54 on the lid 24 in an accurately fitting manner. When the coupling piece 52 is inserted into the recess 54, the periphery of the lid 24 is continued without interruptions. The milk outlet 32, which is fluidically connected to the conveying line (FIG. 1a-c), which is introduced within the coupling piece 52, is arranged on the peripheral side of the coupling piece 52. This conveying line in turn, is fluidically connected to the duct (not illustrated), which runs within the milk lance 26 and in longitudinal direction thereto and which leads into the milk lance opening 28. The milk lance opening 28 and the milk outlet 32 are thus fluidically connected to one another. Due to the fact that only components of the lid 24, which come into contact with milk, must be cleaned and rinsed routinely, it is sufficient when the coupling piece 52 is separated from the lid 24 via the recess 54. This coupling piece 52 including the milk lance 26 can then be subjected to a thorough cleaning with water or with a further cleaning solution. In response to a rinsing, in particular the duct and also the conveying line can be cleaned or rinsed, reliably, respectively. The filling state sensor 34, which detects the filling state of the milk container (not illustrated), is attached to the distal end of the milk lance 26.

In this example, the lid 24 further contains the filling state measuring electronics system and the sensor (both not illustrated), which are accommodated in the interior of the lid 24. These electronic components can be accommodated in a recess in the lid 24 or can be completely cast with the material of the lid 24. A display element 56, which displays an optical display relating to the filling state of the milk container, is arranged on the outer surface of the lid 24. The display element 56 contains two LEDs 56', 56", which display information relating to the filling state of the milk container by lighting up or by going out.

A transmission button 58, which is electrically connected to the transmitter, is provided at the outer surface of the lid 24, which can be accessed well by the user. This button 58 must be operated in response a first start-up or after a replacement of the transmitter/receiver (of the beverage preparation machine) with another transmitter/receiver and/or after a replacement of the transmitter (of the milk chilling device 10). At the same time, a button (not illustrated) must be operated at the beverage preparation machine, so that the transmitter and the transmitter/receiver identify one another by exchanging a signaling protocol and couple via the air interface.

An interface element 46' of an energy supply interface is attached to a further peripheral section of the lid 26. This interface element 46' is complementary to a further interface element (not illustrated), which is arranged on the milk container body (not illustrated). Both interface elements are oriented and arranged such that they are electrically connected to one another when the lid 24 is arranged such that it cover or closes the milk container 14 or the milk container body 12 respectively. In this example, the interface element 46' contains coaxially oriented connecting elements (coaxial plugs), which match connecting elements (coaxial socket), which are oriented in a complementary manner, on the milk container body and establish an electrical connection via said connecting elements, as soon as the lid 24 is attached. The electrical connection, which is thus established, couples the external electrical energy source (not illustrated) to the filling state measuring electronics system and the transmitter, so that they are supplied with electrical energy.

Figure 3B:
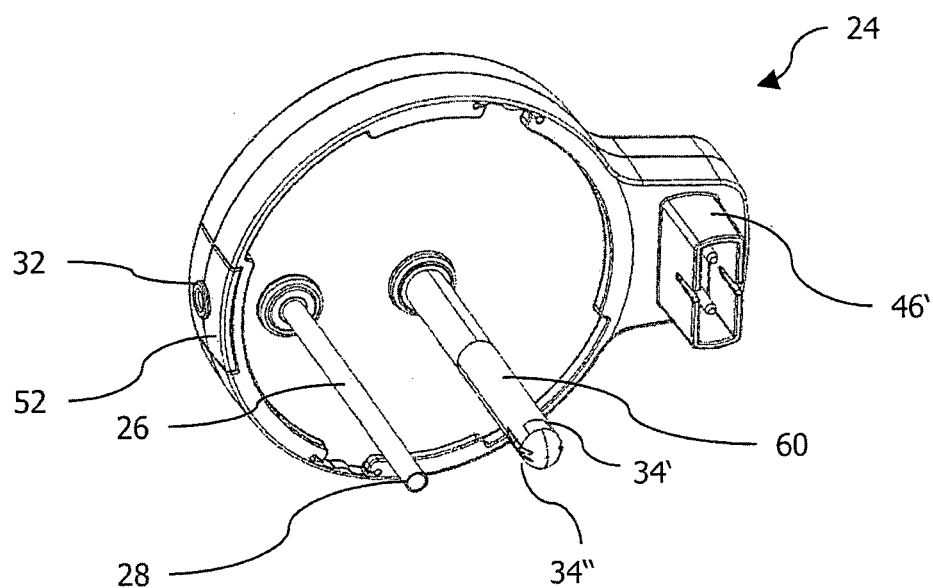

FIGS. 3a and b in each case show a second example of the lid 24 in a top view (FIG. 3a) and in a bottom view (FIG. 3b) in perspective illustration. The illustrated lid 24 differs from the lid illustrated in FIGS. 2a and b in that a sensor lance 60 is additionally contained. This sensor lance 60 is attached to the bottom side of the lid 24 such that it also projects substantially completely into the milk container 14 when the lid 24 is arranged such that it covers or closes the milk container 14 or the milk container body 12, respectively. The milk lance 26 and sensor lance 60 can run parallel to one another. The filling state sensor 34 is now not attached to the milk lance 26, but to the sensor lance 60. It is thus permanently electrically connected to the filling state measuring electronics system (not illustrated) contained in the lid 24. In this example, the filling state sensor 34 contains two sensor elements 34', 34", which are attached to the distal end of the sensor lance 60. The milk lance 26 can now furthermore be separated from the main body of the lid 24 via the coupling piece 52, so as to be subjected to a thorough cleaning, for example, wherein an electrical interface must not at all be present between the coupling piece 52 and the main body of the lid 24. Possible errors sources, for example caused by a contamination due to milk residues, are made impossible through this. In this example, the interface element 46' contains axially oriented connecting elements (axial plugs), which match connecting elements (axial socket), which are oriented in a complementary manner, on the milk container and establish an electrical connection via said connecting elements, as soon as the lid 24 is attached. The electrical connection, which is thus established, couples the external electrical energy source (not illustrated) to the filling state measuring electronics system and the transmitter, so that they are supplied with electrical energy.

FIG. 4 shows a schematic view of a beverage preparation machine 62, which can be operated in combination with one of the embodiments of a milk chilling device illustrated in FIGS. 1-3. One example illustrated in FIG. 4 is a combination unit of the beverage preparation machine 62 and the milk chilling device 10 according to FIG. 1a. The beverage preparation machine 62 comprises a control electronic system 63, among others, which monitors and controls all of the functions of the beverage preparation machine 62. The beverage preparation machine 62 furthermore contains a milk dispensing apparatus 64 with a milk inlet 64.1, which can be coupled to one end of a milk tube 32' or to another form of a milk line. At its further end, this milk tube 32' is fluidically connected to the milk outlet 32 of the milk chilling device 10. The beverage preparation machine 62 furthermore contains a transmitter/receiver 66, which receives the filling state information signal transmitted by the transmitter 38 of the milk chilling device 10 and which contains information relating to the filling state of the milk container 14 of the milk chilling device 10.

The transmitter/receiver 66 can optionally also receive an auxiliary unit information signal from one or a plurality of auxiliary units (not illustrated) in cooperation with the beverage preparation machine 62. This auxiliary unit information signal is hereby transmitted via a radio device comprised in the auxiliary unit. The beverage preparation machine 62 can thus be informed about the state of these auxiliary units in a wireless manner. The radio device can furthermore be used in the case of service or in the case of the device production, so as to import or read out an electronic memory of the beverage preparation machine 62. In this case, the transmitter/receiver 66 of the beverage preparation machine 62 as well as the radio device of the auxiliary unit are designed for the bi-directional communication.

The transmitter/receiver 66 can be plugged into a corresponding interface at the outside of the beverage preparation machine 62. The beverage preparation machine 62 can thus optionally be expanded quickly and easily with this transmitter/receiver 66. In the alternative, the transmitter/receiver 66 can be integrated in the interior of the beverage preparation machine 62 on a circuit board, on which the control electronics system 63 is implemented. The receipt of the filling state information signal takes place via the air interface 40. The signal exchange between the transmitter of the milk chilling device and the transmitter/receiver 66 of the beverage preparation machine 62 can take place via a carrier signal on an ISM band carrier frequency (2.4 GHz) or on another carrier high-frequency.

A user interface 68, via which different coffee specialties can be chosen manually, is arranged on an outer surface of the beverage preparation machine 62, which faces the user. This selection can be made by means of the operation of a respective button, which is assigned to a certain coffee specialty. It goes without saying that further inputs, such as the desired quantity of the selected coffee specialty, temperature, aroma, additional preparation options, information relating to the preparation of the milk or of the milk froth, etc., for example, can also be made via the user interface 68.

Provision is further made for a database 70, which stores information relating to a necessary milk volume for the preparation of a respective coffee specialty, which can be selected at the user interface 68 in each case. The designation of the respective desired quantity is also included in this information. In the instant example, the database 70 is realized as integral component of the control electronics system 63.

The transmitter/receiver 66, the user interface 68 and the database 70 are in each case electrically connected to a decision logic 72, which, in the instant example, is realized as integral part of the control electronics system 63. After inputting the desired coffee specialty via the user interface 68, the decision logic 72 reads information relating to a milk volume, which is necessary for this, from the database 70 in response to this input. The decision logic 72 further compares this information with the information relating to the filling state of the milk container received via the transmitter/receiver 66. The decision logic 72 decides on the basis of this comparison, whether or not the milk volume contained in the milk container 10 is larger than the milk volume, which is necessary to prepare the respective selected coffee specialty. The decision logic 72 emits a release signal or a non-release signal for the release or non-release of a milk dispensing from the milk dispensing apparatus 64 on the basis of this decision.

This signal is input into an electrically controllable fluid valve 74, which is electrically connected to the outlet of the decision logic 72. When the release signal is applied, the fluid valve 74 can open a fluid passage for conveying a steam through the milk dispensing apparatus 64. However, in the event that the non-release signal is applied, the fluid valve 74 leaves this fluid passage closed. Further components can be connected to the outlet of the decision logic 72, which make preparations for dispensing steam/milk, as soon as the release signal is present. For example, a thermal element 76 can be controlled for generating steam.

The milk dispensing apparatus 64 contains a chamber 78 for generating an underpressure, as soon as steam is guided through this chamber 78. This underpressure is generated on the basis of the Venturi principle. The chamber 78, in turn, is in fluidic connection with the milk inlet 64.1, so that an underpressure is also generated at the milk inlet 64.1, as soon as steam is guided through the chamber 78. Milk is in turn sucked out of the milk chilling device 10 by means of this underpressure. The milk, which is sucked in, is mixed with the steam in the chamber 78 and is heated and/or frothed. For this purpose, provision can be made for an air inlet, which is not illustrated in the figure, via which ambient air is let into the chamber 78. The respective prepared coffee specialty is dispensed via an outlet of the milk dispensing apparatus 64 into a cup 80, which is placed therebelow.

In this example, the milk dispensing apparatus 64 was described as an apparatus, which prepares obtained milk by adding steam and/or air and which hereby dispenses milk, heated milk and/or frothed milk. Beforehand, black coffee or espresso obtained respectively can be dispensed through a further separate dispensing apparatus (not illustrated). Dispensing apparatuses are also known, which dispense black coffee or espresso as well as milk, heated milk and/or frothed milk. The beverage preparation machine 62 can also receive a temperature signal, which is transmitted by the transmitter of the milk chilling device, and which contains information relating to the temperature of the milk volume in the milk container of the milk chilling device.

This information can be displayed on a display device 82, which is also attached on the outer surface of the beverage preparation machine 62 facing the user. Information relating to the filling state of the milk container can further be displayed on the display device 82. The user is thus always informed about the filling state of the milk container and simultaneously about the temperature of the milk volume in a well visible manner.

FIGS. 5a, b show the transmitter/receiver 66, which is shown schematically in FIG. 4, in two different perspective view. This transmitter/receiver 66 contains a plug 84, which can be plugged into a complementary socket of the beverage preparation machine (both not illustrated) from the outside. In the instant example, the plug 84 is a special plug for a proprietary interface, which is optimized for respective demands. A receiver button 86 is provided at an outer surface of the transmitter/receiver 66, which can be accessed well by the user. In response to a first start-up or after a replacement of the beverage preparation machine 62, of the transmitter/receiver 66 or of the lid 24 of the milk chilling device 10, this button 86 must be operated at the transmitter/receiver 66. At the same time, a button 58 must be operated on the upper side of the lid 24 of the milk chilling device 10, so that the transmitter 38 and the transmitter/receiver 66 can identify, assign and couple one another by exchanging a signaling protocol.

FIG. 5c shows the transmitter/receiver 66 in a changed embodiment. This transmitter/receiver 66 has a plug 84 of a standardized interface, for example a D-sub plug, RS-232 plug, USB plug, etc. The receiver button 86 for triggering the signalizing protocol for assigning and coupling a transmitter, which belongs to the transmitter/receiver 66, is also arranged on the upper side of the transmitter/receiver 66. The transmitter/receiver 66 is designed to transmit and/or receive an information signal—independent on the embodiment.

FIG. 6 shows a schematic illustration of a combination unit of the milk chilling device 10 and the beverage preparation machine 62. The lid 24 of the milk chilling device 10 contains a (not illustrated) transmitter, which communicates via the air interface 40 with the transmitter/receiver 66, which, in turn, is electrically connected to the control electronics system (not illustrated) of the beverage preparation machine 62. The transmitter transmits information relating to the filling state of the milk container (not illustrated) of the milk chilling device 10 to the transmitter/receiver 66. Based on this information, a decision logic (not illustrated) within the beverage preparation machine 62 decides, whether the milk volume contained in the milk container of the milk chilling device 10 is sufficient to prepare a respective coffee specialty selected at the user interface 68. In the event that the milk volume is not sufficient, the obtaining of milk is not ordered. In the event that the milk volume is sufficient, the milk dispensing apparatus 64 sucks the correspondingly required milk volume at the beverage preparation machine 62 via a milk tube (not illustrated) between the milk dispensing apparatus 64 and the milk outlet 32 on the lid 24. The milk is then either only sucked in, heated and/or frothed in the milk dispensing apparatus 64 by supplying steam.

The combination unit can further comprise an auxiliary unit 88 comprising a radio device 90. This auxiliary unit 88 can be used in cooperation with the beverage preparation machine 62. The beverage preparation machine 62 can thus be informed about the state of this auxiliary unit 88 in a wireless manner. For example, the auxiliary unit 88 can be implemented as a billing system (coin or chip counter, key U-key, cards with a virtual balance, credit cards), in that the paid amount is reported to the beverage preparation machine 62 and the latter then releases or blocks the obtaining of a coffee specialty. The radio device 90 can furthermore be used in the case of service or in the case of the unit production, so as to import or read out an electronic memory of the beverage preparation machine 62.

FIG. 7 shows a flow chart of a method for obtaining a milk volume from the milk chilling device to the milk dispensing apparatus of the beverage preparation machine.

The onset of the method is triggered by selecting a respective coffee specialty via the user interface at the beverage preparation machine.

The filling state of the milk container of the milk chilling device is detected in a step S1.

In a step S2, the information relating to the filling state of the milk container is transmitted to the beverage preparation machine via the air interface.

This information is applied to the decision logic of the beverage preparation machine in a step S3.

In a step S4, the information relating to the user selection of the respective selected coffee specialty, which is input beforehand into the beverage preparation machine via the user interface, is transferred to the decision logic.

In a step S5, information relating to a respective necessary milk volume to prepare the respective selected coffee specialty is read out from the database.

In a step S6, information relating to the necessary milk volume is compared to the information relating to the filling state of the milk container. When a decision has been made in step S6 on the basis of the comparison that the filling state of the milk container is larger than the necessary milk volume (YES), a release signal is output in a step S7'.

When a decision has been made in step S6 that the filling state of the milk container is lower than the necessary milk volume (NO), a non-release signal is output in a step S7".

In a steps S8, the release signal or non-release signal is applied to the electrical fluid valve of the milk dispensing apparatus of the beverage preparation machine.

Step S2 can comprise a step S2', which contains the transmission of information relating to the temperature of the milk volume in the milk container via the air interface to the beverage preparation machine.

Step S3 can comprise a step S3', which contains a display of the information relating to the filling state of the milk container and/or relating to the temperature of the milk volume in the milk container at the milk chilling device and/or at the beverage preparation machine.

The invention claimed is:

1. A combination unit of a beverage preparation machine to prepare a beverage and a separate milk chilling device for the storing of a milk volume in a chilled state,
    said beverage preparation machine comprising a control electronics system and a milk dispensing apparatus encompassing a milk inlet for dispensing milk and/or milk froth,
    said milk chilling device comprising:
        a housing,
        a milk container arranged in the housing for accommodating the milk volume,
        a chilling unit for chilling the milk volume and
        a milk lance comprising an end projecting into the milk container and an end, which is fluidically connected to a milk outlet of the milk chilling device, for removing milk from the milk container, wherein the milk inlet of the milk dispensing apparatus is connected or can be connected to the milk outlet of the milk chilling device by means of a milk line,
    said combination unit of the beverage preparation machine comprising:
        a monitoring means for monitoring a filling state of the milk container comprising a filling state sensor arranged in the milk container and/or in the housing of the milk chilling device for detecting a filling level of the milk in the milk container and
        a filling state measuring electronics system connected to the filling state sensor for generating a filling state information signal, said filling state information signal contains information relating to the filling level detected by the filling state sensor,
    wherein a dispensing of the milk and/or of the milk froth from the milk dispensing apparatus can be controlled by means of the control electronics system of the beverage preparation machine as a function of the filling state information signal generated by the filling state measurement electronics system,
    wherein the filling state measuring electronics system is arranged in or on the housing of the milk chilling device,
    wherein the milk chilling device further comprises a transmitter for transmitting the filling state information signal generated by the filling state measurement electronics system to the beverage preparation machine via an air interface by means of a radio signal, which can be generated by the transmitter, and
    wherein the beverage preparation machine further comprises a transmitter/receiver, which is designed to receive the radio signal generated by the transmitter of the milk chilling device and to provide the filling state information signal transmitted by means of the radio signal to the control electronics system of the beverage preparation machine.

2. The combination unit according to claim 1, wherein the housing of the milk chilling device encompasses a milk container body, which comprises the milk container, and a lid for closing or covering the milk container.

3. The combination unit according to claim 2, wherein the filling state measuring electronics and/or the transmitter of the milk chilling device are contained in the lid.

4. The combination unit according to claim 2, wherein the filling state sensor is attached to a sensor lance, which is fastened to the bottom side of the lid such that it projects substantially completely into the milk container when the lid is arranged such that it covers or closes the milk container.

5. The combination unit according to claim 1, wherein the filling state measuring electronics system and/or the transmitter can be supplied with electrical energy via at least one energy storage, which is arranged in or on the housing of the milk chilling device.

6. The combination unit according to claim 2, wherein the filling state measuring electronics system and/or the transmitter of the milk chilling device can be supplied with electrical energy via an external electrical energy source, which can be coupled to the milk container body.

7. The combination unit according to claim 6, wherein the external electrical energy source can be coupled electrically to the filling state measuring electronics system and/or the transmitter of the milk chilling device via an energy supply interface between the milk container body and the lid.

8. The combination unit according to claim 7, wherein the energy supply interface contains at least two interface elements, which are in each case oriented and arranged on the milk container body and on the lid such that they are electrically connected to one another when the lid is arranged such that it covers or closes the milk container.

9. The combination unit according to claim 2, wherein the filling state measuring electronics system and/or the transmitter are contained in the milk container body.

10. The combination unit according to claim 9, wherein the filling state measuring electronics system and/or the transmitter of the milk chilling device can be supplied with electrical energy via an external electrical energy source, which can be coupled to the milk container body.

11. The combination unit according to claim 1, wherein the beverage preparation machine further comprising:
a user interface, via which different coffee specialties can be chosen manually,
a database, which stores information relating to a necessary milk volume to prepare a coffee specialty, which can in each case be selected at the user interface,
a decision logic comprising inputs, which are in each case connected to the transmitter/receiver, the user interface and the database, wherein the decision logic is designed to read out information relating to a milk volume, which is necessary for this, from the database in response to an input at the user interface, to compare this information with the received information relating to the filling state of the milk container, and to only dispense milk from the milk dispensing apparatus under the condition that the milk volume contained in the milk container is not smaller than the milk volume, which is necessary to prepare the respective selected coffee specialty.

12. The combination unit according to claim 1, further comprising at least one auxiliary unit comprising a radio device for transmitting an auxiliary unit information signal to the beverage preparation machine and/or for receiving a beverage preparation machine information signal from the beverage preparation machine via one air interface, in each case.

13. The combination unit of claim 1, wherein there is no wired electronic connection between the milk chilling device and the beverage preparation machine.

14. A combination unit of a beverage preparation machine to prepare a beverage and a separate milk chilling device for the storing of a milk volume in a chilled state,
said beverage preparation machine comprising a control electronics system and a milk dispensing apparatus encompassing a milk inlet for dispensing milk and/or milk froth,
said milk chilling device comprising:
a housing,
a milk container arranged in the housing configured to receive the milk volume,
a chilling unit configured to chill the milk volume and
a milk lance comprising an end projecting into the milk container and an end, which is fluidically connected to a milk outlet of the milk chilling device, for removing milk from the milk container, wherein the milk inlet of the milk dispensing apparatus and the milk outlet are connected to a milk line, and wherein the milk line is configured to fluidically connect the milk inlet of the milk dispensing apparatus and the milk outlet of the milk chilling device,
said combination unit of the beverage preparation machine comprising:
a monitoring means for monitoring a filling state of the milk container comprising a filling state sensor arranged in the milk container and/or in the housing of the milk chilling device for detecting a filling level of the milk in the milk container and
a filling state measuring electronics system connected to the filling state sensor for generating a filling state information signal, said filling state information signal contains information relating to the filling level detected by the filling state sensor,
wherein a dispensing of the milk and/or of the milk froth from the milk dispensing apparatus can be controlled by means of the control electronics system of the beverage preparation machine as a function of the filling state information signal generated by the filling state measurement electronics system,
wherein the filling state measuring electronics system is arranged in or on the housing of the milk chilling device,
wherein the milk chilling device further comprises a transmitter configured to transmit the filling state information signal generated by the filling state measurement electronics system to the beverage preparation machine via an air interface by means of a radio signal, which radio signal is configured to be generated by the transmitter,
wherein the beverage preparation machine further comprises a transmitter/receiver, which is designed to receive the radio signal generated by the transmitter of the milk chilling device and to provide the filling state information signal transmitted by means of the radio signal to the control electronics system of the beverage preparation machine,
wherein the housing of the milk chilling device encompasses a milk container body, which comprises the milk container, and a lid for closing or covering the milk container, and
wherein the filling state measuring electronics system and/or the transmitter of the milk chilling device is configured to receive electrical energy via an external electrical energy source, which is configured to be coupled to the milk container body.

* * * * *